United States Patent
Sakurai

(10) Patent No.: US 10,679,789 B2
(45) Date of Patent: Jun. 9, 2020

(54) METHOD OF MANUFACTURING HIGH-DENSITY COIL

(71) Applicant: SELCO CO., LTD., Komoro-shi, Nagano (JP)

(72) Inventor: Hiroshi Sakurai, Komoro (JP)

(73) Assignee: SELCO CO., LTD. (JP)

( * ) Notice: Subject to any disclaimer, the term of this patent is extended or adjusted under 35 U.S.C. 154(b) by 150 days.

(21) Appl. No.: 15/567,278

(22) PCT Filed: May 22, 2017

(86) PCT No.: PCT/JP2017/019026
§ 371 (c)(1),
(2) Date: Oct. 17, 2017

(87) PCT Pub. No.: WO2018/216065
PCT Pub. Date: Nov. 29, 2018

(65) Prior Publication Data
US 2018/0336997 A1   Nov. 22, 2018

(51) Int. Cl.
*H01F 7/06* (2006.01)
*H01F 41/04* (2006.01)
*H01F 27/28* (2006.01)
*H01F 41/071* (2016.01)

(52) U.S. Cl.
CPC ............ *H01F 41/04* (2013.01); *H01F 27/28* (2013.01); *H01F 41/071* (2016.01)

(58) Field of Classification Search
CPC ........ H01F 41/04; H01F 41/071; H01F 27/28; Y10T 29/4902; Y10T 29/49071

USPC ................................................. 29/602.1, 605
See application file for complete search history.

(56) References Cited

U.S. PATENT DOCUMENTS

| | | | | |
|---|---|---|---|---|
| 7,825,562 B2* | 11/2010 | Naganawa | ........... | H02K 15/063 310/184 |
| 8,028,398 B2* | 10/2011 | Yeadon | ..................... | B21F 1/00 29/596 |
| 9,978,492 B2* | 5/2018 | Makino | ..................... | H01F 5/00 |
| 2004/0183639 A1 | 9/2004 | Okura et al. | | |

FOREIGN PATENT DOCUMENTS

| | | |
|---|---|---|
| GB | 1 079 815 A | 8/1967 |
| GB | 2 533 193 A | 6/2016 |
| JP | S56-17006 A | 2/1981 |
| JP | 2004-193395 A | 7/2004 |

(Continued)

OTHER PUBLICATIONS

Extended European Search Report for Application No. EP 17 77 7147 dated Dec. 5, 2019 (6 pages).

(Continued)

*Primary Examiner* — Donghai D Nguyen
(74) *Attorney, Agent, or Firm* — Harness, Dickey & Pierce, P.L.C.

(57) ABSTRACT

A method of manufacturing a high-density coil formed by press working a coil to cope with the manufacture of high-density coils having various cross-sectional shapes. The method includes: a step of setting the coil at a predetermined press working position in a press working machine; and a step of sequential press working the coil, which is set at the predetermined press working position, in a plurality of directions sequentially with a time lag.

2 Claims, 5 Drawing Sheets

(56) References Cited

FOREIGN PATENT DOCUMENTS

| | | |
|---|---|---|
| JP | 2005-072428 A | 3/2005 |
| JP | 2007-267463 A | 10/2007 |
| JP | 2008-228434 A | 9/2008 |
| JP | 2014-093492 A | 5/2014 |
| WO | WO-2016-051175 A1 | 4/2016 |

OTHER PUBLICATIONS

Chinese Office Action for Application No. 201780001166.7 dated Mar. 13, 2020 with English translation (10 pages).

* cited by examiner

METHOD OF MANUFACTURING HIGH-DENSITY COIL

CROSS-REFERENCE TO RELATED APPLICATIONS

This application is a U.S. National Stage Application of International Application No. PCT/JP2017/019026, filed on May 22, 2017. The entire disclosure of the above application is incorporated herein by reference.

BACKGROUND OF THE INVENTION

Technical Field

The present invention relates to a method of manufacturing a high-density coil.

Background Art

There is disclosed a method of manufacturing a high-density coil achieving a high space factor without damaging a round copper wire in complete aligned winding of the round copper wire (see JP 2005-72428 A). In the manufacturing method disclosed in JP 2005-72428 A, the complete aligned winding is performed by using the round copper wire having an elongation percentage of from 30% to 40%, and then the round copper wire is heated and pressed at a temperature of from 150° C. to 230° C. to fill space portions between windings of the round copper wire so that a space factor is enhanced.

In the manufacturing method disclosed in JP 2005-72428 A, steps of press working a coil in two directions, namely, a vertical direction and a horizontal direction are performed under the same conditions. Accordingly, only a high-density coil having a rectangular cross section can be manufactured. Meanwhile, there are demands for high-density coils having various cross-sectional shapes, for example, a coil having a tapered cross section. The manufacturing method disclosed in Patent Literature 1 cannot cope with manufacture of a high-density coil having a cross section other than the rectangular cross section.

SUMMARY OF THE INVENTION

The present invention has been made under such a circumstance, and has an object to provide a method of manufacturing a high-density coil capable of coping with manufacture of high-density coils having various cross-sectional shapes.

According to one embodiment of the present invention, there is provided a method of manufacturing a high-density coil formed by press working a coil, the method including: a step of setting the coil at a predetermined press working position in a press working machine; and a step of sequential press working the coil, which is set at the predetermined press working position, in a plurality of directions sequentially with a time lag.

In the above-mentioned method of manufacturing a high-density coil, the step of sequential press working the coil may include: a first step of press working the coil in a direction orthogonal to a winding direction of the coil; a second step of press working the coil in one direction orthogonal to the direction of press working the coil in the first step; and a third step of press working the coil in a direction orthogonal to the directions of press working the coil in the first step and the second step.

In this case, the above-mentioned method can include a step of performing the first step, or, the second step and the third step a plurality of times while changing a moving length of the press working machine.

Advantageous Effects of the Invention

According to the present invention, it is possible to cope with the manufacture of high-density coils having various cross-sectional shapes.

DETAILED DESCRIPTION OF THE PREFERRED EMBODIMENTS

Regarding Outline of the Present Invention

Figure 1:
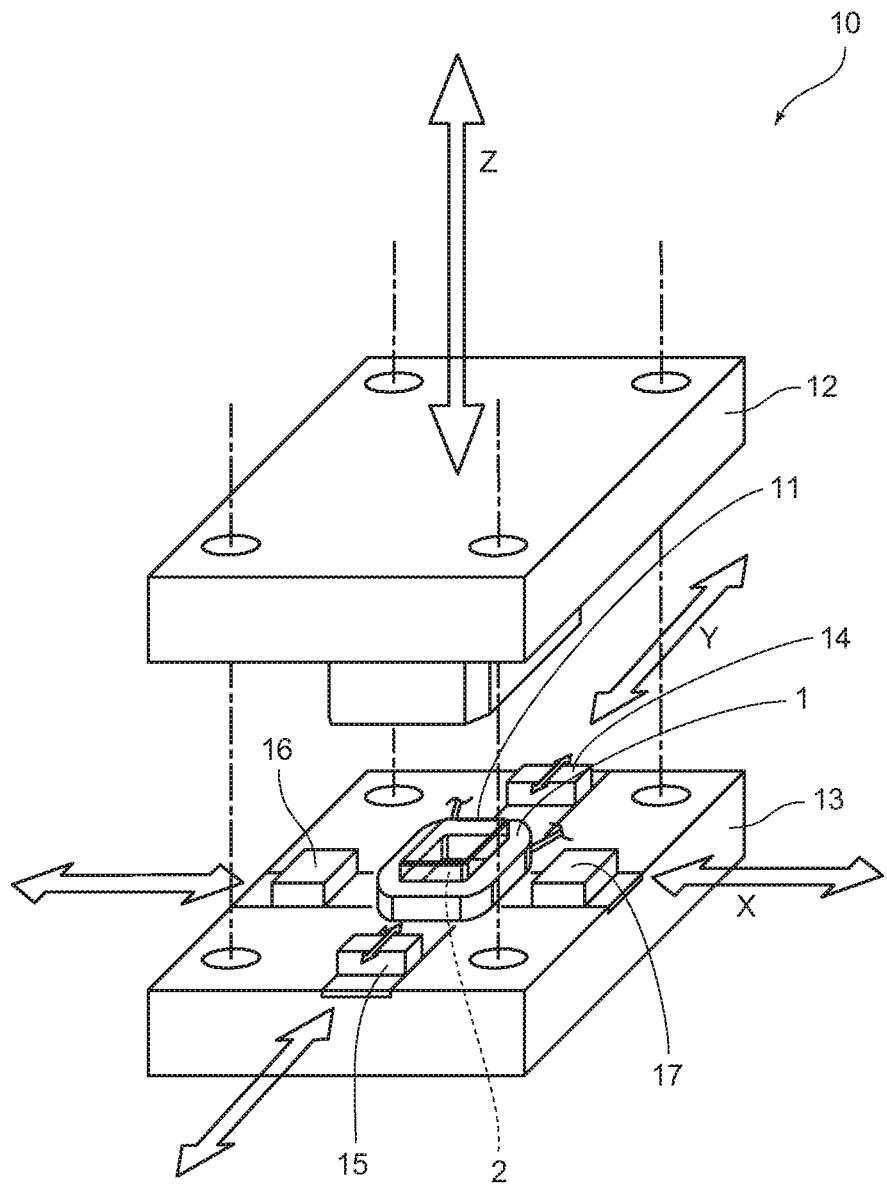
FIG. 1 is a perspective view for illustrating a press working machine of an embodiment of the present invention and a coil set on the press working machine.

As illustrated in FIG. 1, a method of manufacturing a high-density coil according to an embodiment of the present invention includes: a step of setting a coil 1 at a predetermined press working position in a press working machine 10; and a step of press working the coil 1, which is set at the predetermined press working position, in a plurality of directions X, Y, and Z sequentially with a time lag.

Regarding Predetermined Press Working Position in Press Working Machine 10

Figure 2:
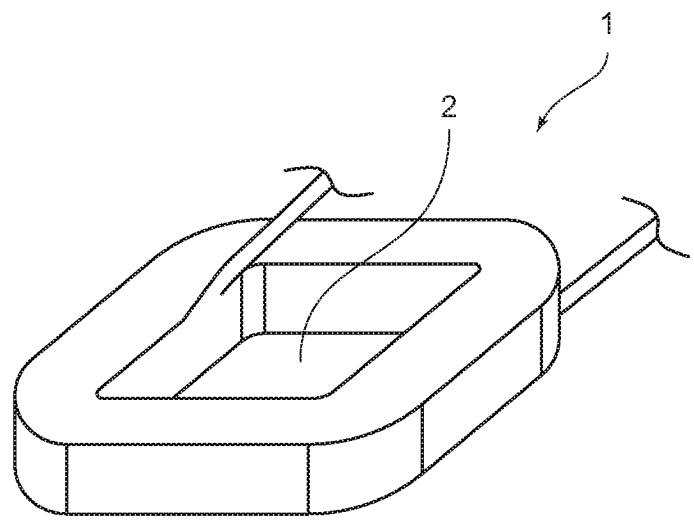
FIG. 2 is a perspective view for illustrating only the coil of FIG. 1.

As illustrated in FIG. 2, the coil 1 includes a hollow portion 2. As illustrated in FIG. 1, the press working machine 10 includes a fixing member 11 arranged at the predetermined press working position so as to pass through the hollow portion 2 of the coil 1. That is, the coil 1 is set at the predetermined press working position in the press working machine 10 so that the fixing member 11 passes through the hollow portion 2.

Regarding Press Working Machine 10

Figure 3:
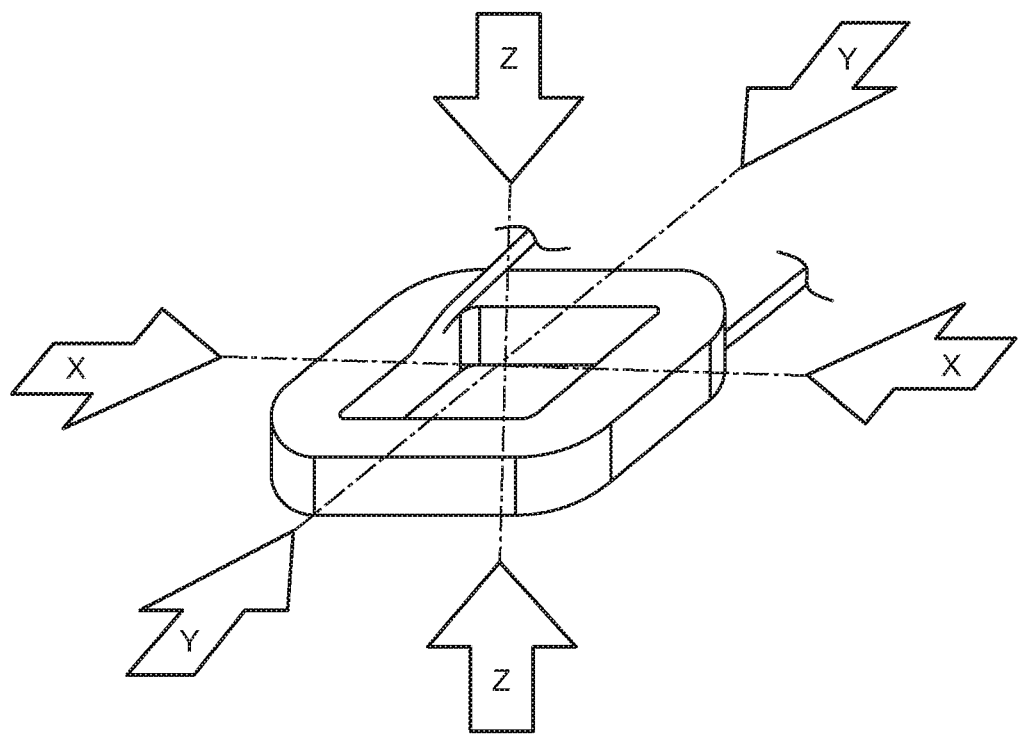
FIG. 3 is a perspective view for illustrating directions of pressing the coil of FIG. 2.

As illustrated in FIG. 1, the press working machine 10 includes the fixing member 11, an upper pressing portion 12, a lower pressing portion 13, a front pressing portion 14, a rear pressing portion 15, a left pressing portion 16, and a right pressing portion 17. The upper pressing portion 12 and the lower pressing portion 13 press the coil 1 in a Z-axis direction, namely, up-and down direction. The front pressing portion 14 and the rear pressing portion 15 press the coil 1 in a Y-axis direction, namely, front-and-rear direction. The left pressing portion 16 and the right pressing portion 17 press the coil 1 in an X-axis direction, namely, right-and-left direction. As illustrated in FIG. 3, regarding the respective directions of pressing the coil 1, a direction orthogonal to a winding direction of the coil 1 is the Z-axis direction, and one direction orthogonal to the Z-axis direction is the X-axis direction or the Y-axis direction. Further, a direction orthogonal to the Z-axis direction and the X-axis direction or the Y-axis direction is the Y-axis direction or the X-axis direction. And, the pressing portions for each of the X-axis direction, the Y-axis direction, and the Z-axis direction are driven independently. Any mechanism may be adopted as a driving mechanism for each of the pressing portions, and hence illustration and description thereof are omitted. Various driving mechanisms, such as a hydraulic driving mechanism and a pneumatic driving mechanism, can be used.

Regarding Pressing Sequence

In the method of manufacturing a high-density coil according to the embodiment of the present invention, the step of sequential press working the coil includes: a first step of press working the coil in the direction orthogonal to the winding direction of the coil, that is, in the Z-axis direction; a second step of press working the coil in the one direction orthogonal to the direction of press working the coil in the first step, that is, in the X-axis direction or the Y-axis direction; and a third step of press working the coil in the direction orthogonal to the directions of press working the coil in the first step and the second step, that is, in the Y-axis direction or the X-axis direction. In this case, the above-mentioned method may include a step of performing the first step, or, the second step and the third step a plurality of times while changing a moving length of the pressing portion.

Comparison with Related-Art Example

In the method of manufacturing a high-density coil disclosed in Patent Literature 1, the coil is pressed in two directions, namely, a vertical direction and a horizontal direction. In Patent Literature 1, there is no description as to changing pressing conditions such as a pressing force and a pressing duration time for each of the operation of pressing the coil in the vertical direction and the operation of pressing the coil in the horizontal direction. Accordingly, it is assumed that, in the manufacturing method disclosed in Patent Literature 1, the coil is pressed simultaneously in the two directions, namely, the vertical direction and the horizontal direction, under the same conditions.

In a case where a coil having a rectangular cross section is to be manufactured, even when the coil is simultaneously pressed in the vertical direction and the horizontal direction under almost the same conditions, the coil can be manufactured because portions of the coil to be pressed have almost the same shape. However, in a case where a coil having a tapered cross section is to be manufactured, portions of the coil to be pressed have different shapes in the vertical direction and the horizontal direction. Thus, the pressing condition must be changed.

Figure 4:
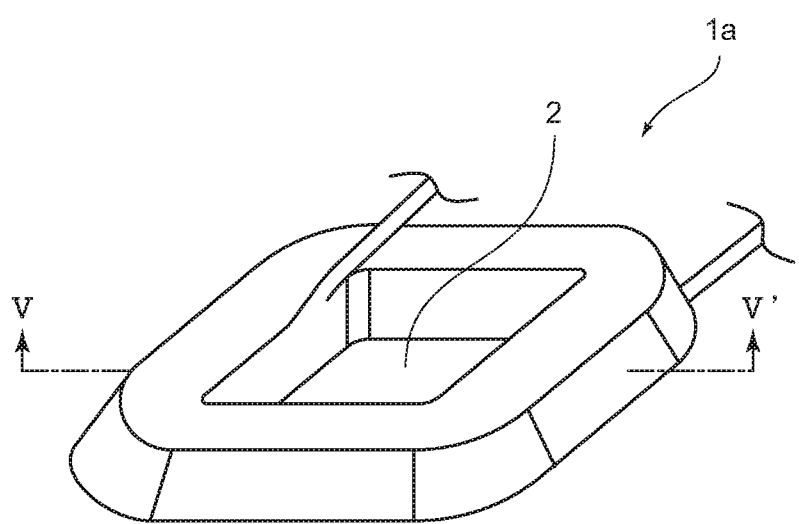
FIG. 4 is a perspective view for illustrating a coil having a tapered shape in cross section.
Figure 5:
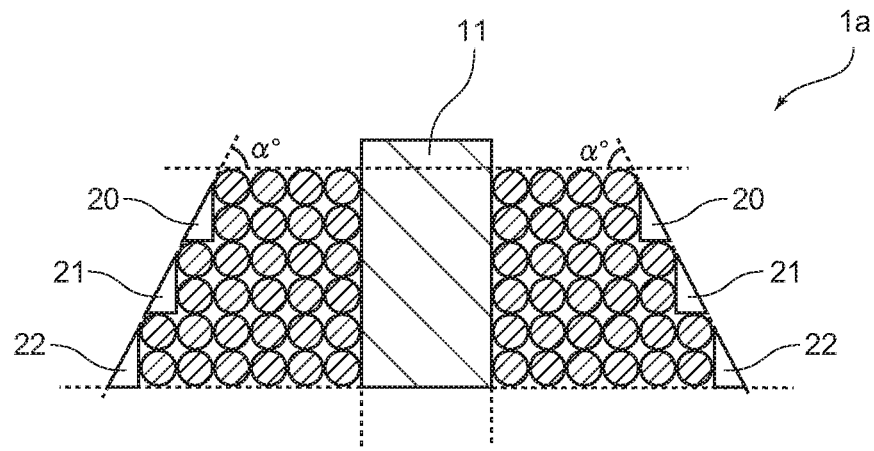
FIG. 5 is a cross-sectional view for illustrating the coil taken along the line A-A' of FIG. 4 before press working.
Figure 6:
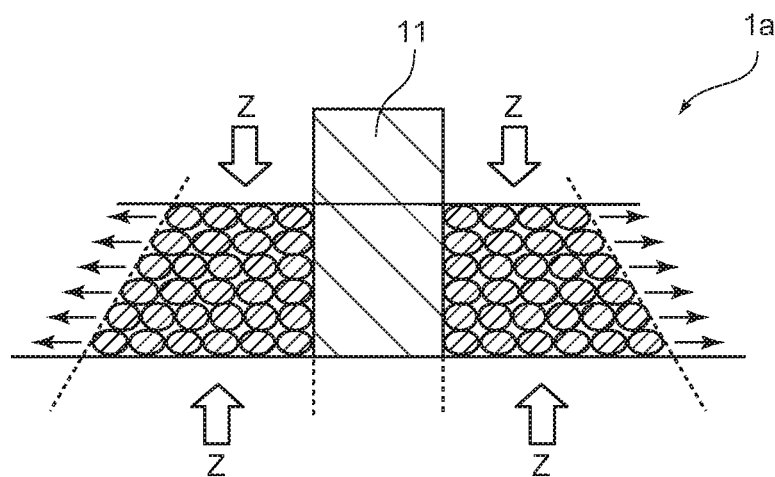
FIG. 6 is a cross-sectional view for illustrating the coil taken along the line A-A' of FIG. 4 after press working in a Z-axis direction.

FIG. 4 is an illustration of a coil 1a having a tapered cross section. FIG. 5 is a cross-sectional view for illustrating the coil 1a taken along the line A-A' of FIG. 4 before press working. The cross section of the coil 1a before the press working includes space portions 20, 21, and 22 that are formed along a predetermined taper angle ($\alpha°$) and contain no round copper wire. A main purpose of the step of pressing the coil in the Z-axis direction, namely, up-and-down direction, namely, which corresponds to the first step, is to deform the round copper wire by pressing so that the round copper wire protrude in the X-axis direction, namely, right-and-left direction, or in the Y-axis direction, namely, front-and-rear direction, thereby filling the space portions 20, 21, and 22. In this manner, as illustrated in FIG. 6, the space portions 20, 21, and 22 illustrated in FIG. 5 are filled with the deformed round copper wire.

Figure 7:
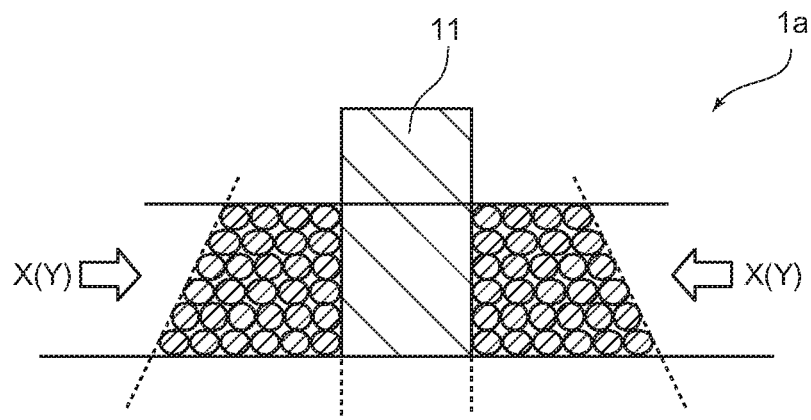
FIG. 7 is a cross-sectional view for illustrating the coil taken along the line A-A' of FIG. 4 after press working in an X-axis direction or in a Y-axis direction.

Subsequently, as illustrated in FIG. 7, the coil 1a is pressed in the X-axis direction, namely, right-and-left direction, or in the Y-axis direction, namely, front-and-rear direction, which corresponds to the second step. A main purpose of the step of pressing the coil in the X-axis direction, namely, right-and-left direction, or in the Y-axis direction, namely, front-and-rear direction, which corresponds to the second step, is to deform the round copper wire by pressing so that the coil is formed into a tapered shape being a final target shape in the X-axis direction or in the Y-axis direction. In this manner, the coil 1a is formed into the tapered shape being the final target shape in the X-axis direction or in the Y-axis direction.

Finally, the coil 1a is pressed in the Y-axis direction, namely, front-and-rear direction, or in the X-axis direction, namely, right-and-left direction, which corresponds to the third step. A main purpose of pressing the coil in the Y-axis direction, namely, front-and-rear direction, or in the X-axis direction, namely, right-and-left direction, which corresponds to the third step, is to deform the round copper wire by pressing so that the coil is formed into a tapered shape being a final target shape in the Y-axis direction or in the X-axis direction. In this manner, the coil 1a is formed into a target shape being a final target shape in all of the Z-axis direction, the X-axis direction, and the Y-axis direction.

In the above-mentioned steps, the purposes of pressing the coil in the respective axis directions are different. Further, shapes of the portions of the coil to be pressed as viewed from the respective axis directions are different. Therefore, the pressing force and the pressing duration time for each of the axis directions are necessarily different. For example, it is preferred that the pressing force in the Z-axis direction be equally applied to all of a large number of layers of the round copper wire in the Z-axis direction. In contrast, the pressing forces in the X-axis direction and in the Y-axis direction are only required to be large enough to press portions of the round copper wire, which protrude from a range within a target taper angle, into the range in the X-axis direction and in the Y-axis direction. Therefore, the pressing force in the Z-axis direction is sometimes set to be larger than the pressing force in the X-axis direction and the pressing force in the Y-axis direction.

Further, the pressing force in the Z-axis direction is sometimes set to be larger than the pressing force in the X-axis direction and the pressing force in the Y-axis direction, and hence a degree of deformation of the round copper wire by pressing sometimes becomes larger. In this case, when deformation of the round copper wire proceeds rapidly, the round copper wire may be damaged. Accordingly, it is preferred that a duration time for pressing the coil in the Z-axis direction be set longer than a duration time for pressing the coil in the X-axis direction and in the Y-axis direction. Thus, rapid deformation of the round copper wire can be avoided.

As described above, when the coil is simultaneously pressed in the two directions, namely, the vertical direction and the horizontal direction, under the same pressing conditions as in the method of manufacturing a high-density coil disclosed in Patent Literature 1, it is difficult to manufacture the coil la having a cross section other than a rectangular cross section, for example, a coil having a tapered cross section.

Regarding Setting Time Lags Among Pressing Coil in Respective Axis Directions In the above-mentioned steps, a time lag is set so that, after pressing in one axis direction is finished, pressing in another axis direction is performed. Such a time lag is set based on the following two reasons.

(1) Reason 1

Figure 8:
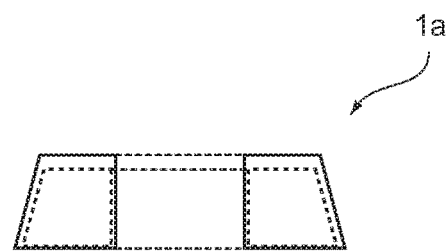
FIG. 8 is a comparative view for illustrating shapes of the coil of FIG. 4 before and after the press working.
Figure 9:
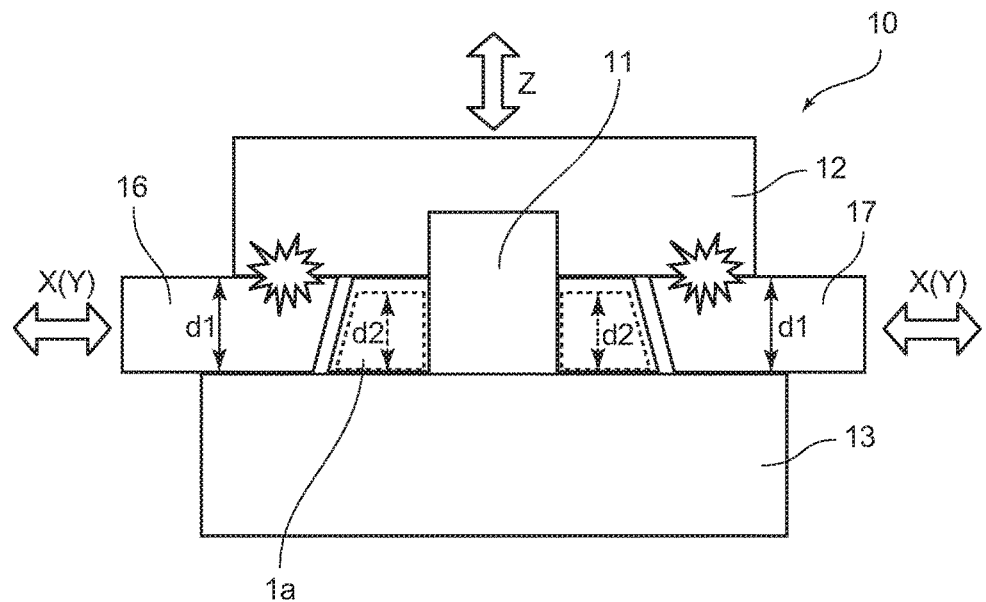
FIG. 9 is a view for illustrating a problem in a case of simultaneously performing a step of pressing the coil in the Z-axis direction and a step of pressing the coil in the X-axis direction or in the Y-axis direction, and for schematically illustrating a state in which the press working machine performs press working.

In FIG. 8, a shape of the coil la before press working is drawn by the solid lines, and a shape of the coil la after being pressed is drawn by the broken line. Further, in an example illustrated in FIG. 9, a thickness d1 of each of the left pressing portion 16 and the right pressing portion 17, or a thickness d1 of each of the front pressing portion 14 and the rear pressing portion 15, is larger than a height d2 of the coil 1a after press working. Under such a condition, when pressing in the Z-axis direction and pressing in the X-axis direction or in the Y-axis direction are simultaneously proceeded, before the upper pressing portion 12 finishes pressing of the coil 1a, the left pressing portion 16 and the right pressing portion 17, or the front pressing portion 14 and the rear pressing portion 15 enter a space between the upper pressing portion 12 and the lower pressing portion 13, and thus inhibit pressing. Accordingly, it is necessary to set a time lag so that, after pressing in one axis direction is finished, pressing in another axis direction is performed.

(2) Reason 2

Figure 10:
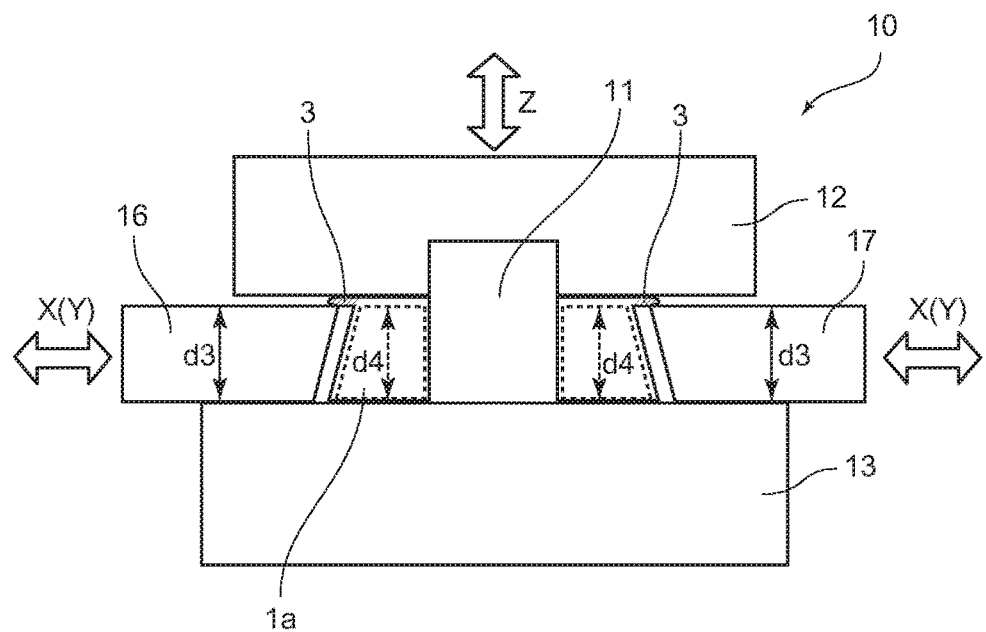
FIG. 10 is a view for illustrating a problem in the case of simultaneously performing the step of pressing the coil in the Z-axis direction and the step of pressing the coil in the X-axis direction or in the Y-axis direction, and for illustrating a problem which is different from the problem illustrated in FIG. 9.

In an example illustrated in FIG. 10, a thickness d3 of each of the left pressing portion 16 and the right pressing portion 17, or a thickness d3 of each of the front pressing portion 14 and the rear pressing portion 15, is set to be equal to a height d4 of the shape of the coil la after press working. Accordingly, the problem described with reference to the example of FIG. 9 does not arise. However, in the example illustrated in FIG. 10, the round copper wire of the coil la is deformed by pressing in the Z-axis direction, and a portion 3 protruding in the X-axis direction or in the Y-axis direction ride over distal end portions of the left pressing portion 16 and the right pressing portion 17, or on distal end portions of the front pressing portion 14 and the rear pressing portion 15, that are proceeded in the X-axis direction or in the Y-axis direction. Thus, there may be a problem in that damage such as breakage of the wire occurs. Accordingly, it is necessary to set a time lag so that, after pressing in one axis direction is finished, pressing in another axis direction is performed.

Regarding Effects of Embodiment of the Present Invention

As described above, according to the embodiment of the present invention, the method of manufacturing a high-density coil includes: a step of setting the coil 1 or 1a at the predetermined press working position in the press working machine 10; and a step of pressing working the coil 1 or 1a, which is set at the predetermined press working position, in the plurality of directions sequentially with the time lag. Thus, it is possible to cope with the manufacture of high-density coils having various cross-sectional shapes.

Other Embodiments

Various variations can be made to the above-mentioned embodiment without departing from the gist of the invention. In the above-mentioned embodiment, the coil la having the tapered cross section is exemplified, but the method of manufacturing a high-density coil according to the embodiment of the present invention is also applicable to coils having other various cross sectional shapes. For example, a corner portion of the tapered cross section of the coil la may be chamfered. Alternatively, a doughnut-shaped coil having a circular cross sectional shape or an oval cross sectional shape may be adopted.

Further, the step of pressing the coil in the X-axis direction and the step of pressing the coil in the Y-axis direction described in the above-mentioned embodiment may be changed in order as appropriate.

The invention claimed is:

1. A method of manufacturing a high-density coil formed by press working a coil, the method comprising:
    a step of setting the coil at a predetermined press working position in a press working machine; and
    a step of sequential press working the coil, which is set at the predetermined press working position, in a plurality of directions sequentially with a time lag, and wherein the step of sequential press working the coil comprises:
    a first step of press working the coil in a direction orthogonal to a winding direction of the coil;
    a second step of press working the coil in one direction orthogonal to the direction of press working the coil in the first step; and
    a third step of press working the coil in a direction orthogonal to the directions of press working the coil in the first step and the second step.

2. A method of manufacturing a high-density coil according to claim 1, further comprising:
    a step of performing the first step, or, the second step and the third step a plurality of times while changing a moving length of a pressing portion.

* * * * *